US009542700B2

(12) United States Patent
Chu

(10) Patent No.: US 9,542,700 B2
(45) Date of Patent: Jan. 10, 2017

(54) BUSINESS MODEL BASED ON MULTI-LEVEL APPLICATION WIDGETS AND SYSTEM THEREOF

(75) Inventor: Yu-Chung Chu, Great Falls, VA (US)

(73) Assignee: Yu-Hua Chu, Taichung (TW)

( * ) Notice: Subject to any disclaimer, the term of this patent is extended or adjusted under 35 U.S.C. 154(b) by 1356 days.

(21) Appl. No.: 12/265,497

(22) Filed: Nov. 5, 2008

(65) Prior Publication Data

US 2010/0114729 A1    May 6, 2010

(51) Int. Cl.
   G06Q 30/00    (2012.01)
   G06Q 30/06    (2012.01)

(52) U.S. Cl.
   CPC .......... G06Q 30/06 (2013.01); G06Q 30/0601 (2013.01)

(58) Field of Classification Search
   CPC .................................................. G06Q 30/0601
   USPC ............................................... 705/26.1–27.2
   See application file for complete search history.

(56) References Cited

U.S. PATENT DOCUMENTS

| 5,973,692 A | 10/1999 | Knowlton et al. | |
|---|---|---|---|
| 6,724,403 B1* | 4/2004 | Santoro ..................... | G09G 5/14 715/765 |
| 7,376,907 B2 | 5/2008 | Santoro et al. | |
| 7,392,483 B2 | 6/2008 | Wong et al. | |
| 7,565,322 B1* | 7/2009 | Feldman et al. ............... | 705/50 |
| 7,565,332 B2* | 7/2009 | Williams et al. ............. | 705/500 |
| 9,104,294 B2* | 8/2015 | Forstall ................. | G06F 3/0481 |
| 2002/0065946 A1* | 5/2002 | Narayan ....................... | 709/315 |
| 2003/0160822 A1* | 8/2003 | Belz et al. ..................... | 345/762 |
| 2003/0188004 A1* | 10/2003 | Fairweather ................. | 709/231 |
| 2005/0257162 A1* | 11/2005 | Danninger et al. ........... | 715/764 |
| 2006/0005207 A1* | 1/2006 | Louch ....................... | G06F 8/38 719/328 |
| 2006/0167704 A1* | 7/2006 | Nicholls .......... | G06Q 10/06393 705/7.39 |

(Continued)

FOREIGN PATENT DOCUMENTS

| TW | 503365 B | 9/2002 |
|---|---|---|
| TW | I240183 B | 9/2005 |

(Continued)

OTHER PUBLICATIONS

Meebo inc. extends its IM platform; the meebo me(TM) widget provides an easy way to integrate IM into websites, enabling embedded web communications everywhere. (Aug. 2, 2006). Business Wire Retrieved from https://dialog.proquest.com/professional/professional/docview/670237192?accountid=142257.*

*Primary Examiner* — Alexis Casey
(74) *Attorney, Agent, or Firm* — C. G. Mersereau; Nikolai & Mersereau, P.A.

(57) ABSTRACT

Provided is a business model based on multi-level application widgets and a system thereof, including: embedding, by a server, intended application widgets in an Internet platform equipped with a software application programming interface; providing a business protocol between an end user and the server, thus giving the end user authority to embed data sets in the application widgets and to conduct display, operation, sales, and real-time interaction within the same window; determining, by the end users, whether at least an application widget or a data set is to be embedded in each of the data sets again, so as to finalize the multi-level application widgets. Accordingly, the end user enhances promotion and thereby expands business on the Internet platform at the server.

13 Claims, 5 Drawing Sheets

(56) References Cited

U.S. PATENT DOCUMENTS

| | | | |
|---|---|---|---|
| 2006/0235548 A1* | 10/2006 | Gaudette | 700/83 |
| 2007/0038934 A1* | 2/2007 | Fellman | 715/700 |
| 2007/0101291 A1* | 5/2007 | Forstall et al. | 715/805 |
| 2007/0101297 A1* | 5/2007 | Forstall et al. | 715/841 |
| 2007/0136643 A1 | 6/2007 | Kang et al. | |
| 2007/0162850 A1* | 7/2007 | Adler et al. | 715/700 |
| 2008/0097871 A1* | 4/2008 | Williams | G06Q 20/10 705/500 |
| 2008/0104496 A1 | 5/2008 | Williams et al. | |
| 2008/0148283 A1* | 6/2008 | Allen et al. | 719/316 |
| 2008/0294998 A1* | 11/2008 | Pyhalammi et al. | 715/748 |
| 2009/0044138 A1* | 2/2009 | Rudolph | G06F 17/3089 715/765 |
| 2009/0094525 A1* | 4/2009 | Coelius et al. | 715/741 |

FOREIGN PATENT DOCUMENTS

| | | |
|---|---|---|
| TW | 200719624 | 5/2007 |
| TW | 200731149 | 8/2007 |
| TW | 200801970 A | 1/2008 |

\* cited by examiner

BUSINESS MODEL BASED ON MULTI-LEVEL APPLICATION WIDGETS AND SYSTEM THEREOF

BACKGROUND OF THE INVENTION

1. Field of the Invention

The present invention relates to a business model and a system thereof, and more particularly, to a business model based on multi-level application widgets and a system thereof configured to enhance promotion and thereby develop a business system.

2. Description of the Prior Art

Owing to the burgeoning information on the Internet, the Internet has become indispensable to daily life of human beings nowadays, allowing people to access the Internet in order to fetch, at any time, medium information, such as news, messages posted by users, and shared video and music.

Plenty of end users, such as enterprises, firms, and shops, create their custom-made homepages to display the products they produce or are going to produce, and present corporate information. In the homepages, product related information is presented in the form of pictures or video and explained in words, allowing website visitors to gain insight into product-related or corporate information. However, web designers have to be professionally trained in programming and experienced in intricate procedure in order to finalize presentation of products and create a homepage.

On the other hand, a lot of people gain access, using an Internet link, to works (for example, diaries or essays) posted, audio/video information shared, and news published on homepages (for example, blogs) hosted by a shared Internet platform. However, to edit essays or share audio/video/news related information on their blogs, authors (or publishers) have to be experienced in intricate procedure of essay editing and audio video news sharing, which is rather inconvenient and time-consuming to the authors.

Conventional blogs and social networking websites allow a user to either edit an essay/picture or play audio/video information (i.e., video and sound) on a single displayed webpage. For instance, a user who is editing an essay on a webpage of a blog or a social networking website is unable to load (embed) audio/video information in the webpage, and in consequence neither the blog nor the social networking website can display the essay and play audio/video information on the same webpage. Also, to load audio/video information in a webpage of a blog or a social networking website, the user has to search laboriously for the path of a saved audio/video file before uploading the located audio/video file to the blog or the social networking website where the file is to be played or viewed by the user.

On the other hand, although users enjoy ease of reading by skimming through or clicking on an e-book available for reading on a webpage of an existing blog or social networking website, a drawback of the prior art remains unsolved—a single webpage on a blog or on a social networking website cannot display a plurality of essays and play a plurality of pieces of audio/video information concurrently and thereby is unfit for functional integration and incapable of increasing value added. Hence, the prior art is intricate, inconvenient, and time-consuming in user/visitor editing. In short, the prior art has the following drawbacks:

1. Editing is time-consuming.
2. Editing requires complicated procedure and therefore is slow, intricate, and inconvenient.
3. Media information cannot be displayed and operated on the same webpage.
4. Low value added.

Accordingly, the inventor of the present invention and related manufacturers are faced with a problem that calls for immediate solution, namely the aforesaid drawbacks of the prior art.

SUMMARY OF THE INVENTION

To solve the above problem, it is a primary objective of the present invention to provide a business model based on multi-level application widgets and built with a multi-level editing structure, and a system of the same.

Another objective of the present invention is to provide a business model that enables an end user to create multi-level widgets on an Internet platform for a server and perform editing quickly on the Internet platform, and a system of the same.

Yet another objective of the present invention is to provide a business model that enables an end user to enhance promotion and develop a business system through a server, and a system of the same.

A further objective of the present invention is to provide a business model that enables an end user to display and operate a variety of multimedia information within the same window, and a system of the same.

A further objective of the present invention is to provide a business model that enables an end user to display e-commerce (Online shopping) information about articles to be sold within the same window, and a system of the same.

A further objective of the present invention is to provide a business model that enables real-time interaction between end users, using an interactive module, within the same window, and a system of the same.

To achieve the above and other objectives, it is an objective of the present invention to provide a business model based on multi-level application widgets, including: providing, by a server, an intended application widget to be embedded in an Internet platform equipped with a software application programming interface; providing a business protocol between an end user and the server; embedding, by the end user, a data set in the application widget; embedding selectively a said application widget in another said application widget according to at least an editing message of the end user, so as to edit and finalize multi-level application widgets, allowing the end users to conduct display, operation, sales, and real-time interaction within the same window, expand business on the Internet platform, and save editing time.

Another objective of the present invention is to provide a system for performing a business model with multi-level application widgets. The system comprises: a server for providing at least an application widget; an Internet platform having a software application programming interface and a webpage to be embedded with the application widget by the server, wherein the webpage is loaded with a list related parameter of the application widget; a database linked to the Internet platform, wherein parameters of intended said application widgets are retrieved from the database, put on the webpage of the Internet platform, and sent to the application widgets by the server; and at least an end user for providing at least a data set to be embedded in the application widgets through the Internet platform, displaying the data sets on the Internet platform so as to be viewed by the end user, and having at least an editing message for selectively embedding a said application widget in another said application widget so as to edit and finalize multi-level application widgets.

Features and technical disclosures of the present invention will be best understood by reference to the following detailed description of the present invention and the accompanying drawings. However, the accompanying drawings are only to be used as references and illustrations but are not intended to limit the present invention.

BRIEF DESCRIPTION OF THE DRAWINGS

The invention as well as a preferred mode of use, further objectives and advantages thereof will be best understood by referring to the following detailed description of illustrative embodiments in conjunction with the accompanying drawings, wherein.

DETAILED DESCRIPTION OF THE EMBODIMENTS

The aforesaid objectives, structural features, and functional features of the present invention will be best understood by reference to the following detailed description of the preferred embodiments when read in conjunction with the accompanying drawings.

Figure 1:
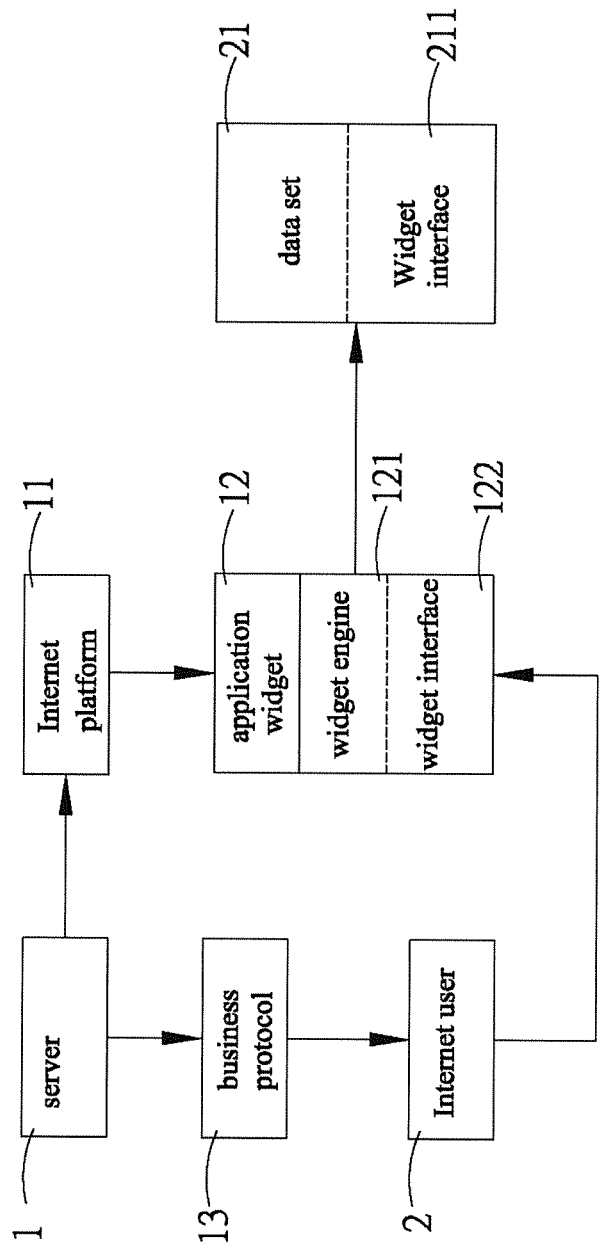
FIG. 1 is a first block diagram of a business process of the present invention.

Referring to FIG. 1, the present invention is directed to a business model based on multi-level application widgets. In a preferred embodiment of the present invention, to expand business on the Internet, an end user 2 presents business related information, particulars of business, information about devised multimedia, e-commerce (Online shopping) information about articles to be sold, etc. on an Internet platform 11 for a server 1. The server 1 embeds a plurality of application widgets 12 in the Internet platform 11. The server 1 selects and loads a list related parameter of the application widgets 12 from a webpage on the Internet platform 11. The Internet platform 11 has a software application programming interface (API). The software application programming interface matches the application widgets 12.

The Internet platform 11 is linked to a database. Intended parameters of the application widgets 12 are loaded from the database and sent to the application widgets 12 via a webpage on the Internet platform 11. Then, the application widgets 12 start loading. Upon receipt of event related information, the Internet platform 11 sends the parameters to the application widgets 12 so as to enable the application widgets 12 to start operation. The application widgets 12 are provided with a widget engine 121 and a widget interface 122. The widget engine 121 receives the parameters, compiles the parameters received, and loads multimedia information of the widget interface 122 of the application widgets 12. The multimedia information loaded undergoes computation and conversion by the code of a programming application before being sent to the widget interface 122 at the bottom. The widget interface 122 displays the multimedia information and e-commerce (Online shopping) information. The multimedia information comprises video, sound, pictures, animation, text, games, advertisement, etc.

After the application widgets 12 have been embedded in the Internet platform 11, a business protocol 13 is formed between the end user 2 and the server 1. The business protocol 13 allows the end user 2 to sign up at the Internet platform 11, obtain an account number, become a member, enter into a contract with the Internet platform 11, and acquire authority to embed a plurality of data sets 21 in the application widgets 12. Once the end user 2 embeds the data sets 21 in the application widgets 12, the data sets 21 will instantly perform compilation, allowing a variety of e-commerce (Online shopping) information and multimedia information of the widget interface 211 of the data sets 21 to be displayed within the same Web window by means of the widget interface 122 at the bottom. The multimedia information comprises video, sound, pictures, animation, text, games, advertisement, etc. The e-commerce (Online shopping) information comprises information about articles for sale and displayed in the Web window by the end user 2. For instance, in the scenario where the end user 2 is a garment retailer, the end user 2 displays articles for sale on the widget interface 211 and presents multimedia information, such as narrative text or try-on video/pictures, on the widget interface 211, and the Web window simultaneously displays articles to be sold by a plurality of said end users 2 and provides update at any time. Hence, the Web window on the Internet platform 11 displays end user-business related information, particulars of business, and information about devised multimedia for use in a business model with a view to developing a business system.

The Internet platform 11 is linked to a database. Intended parameters of the application widgets 12 are loaded from the database and sent to the application widgets 12 via a webpage on the Internet platform 11. The database comprises parameters, such as position, dimension, session, user info, merchandize or content setup, etc. The application widgets 12 at the bottom feature various modes of operation, including frame structure, image search, word processing, audio search, advertisement search, game search, etc. It is up to the end user 2 to decide which mode of operation to use. The business protocol 13 at the server 1 determines the authority to use the modes of operation.

Figure 2:
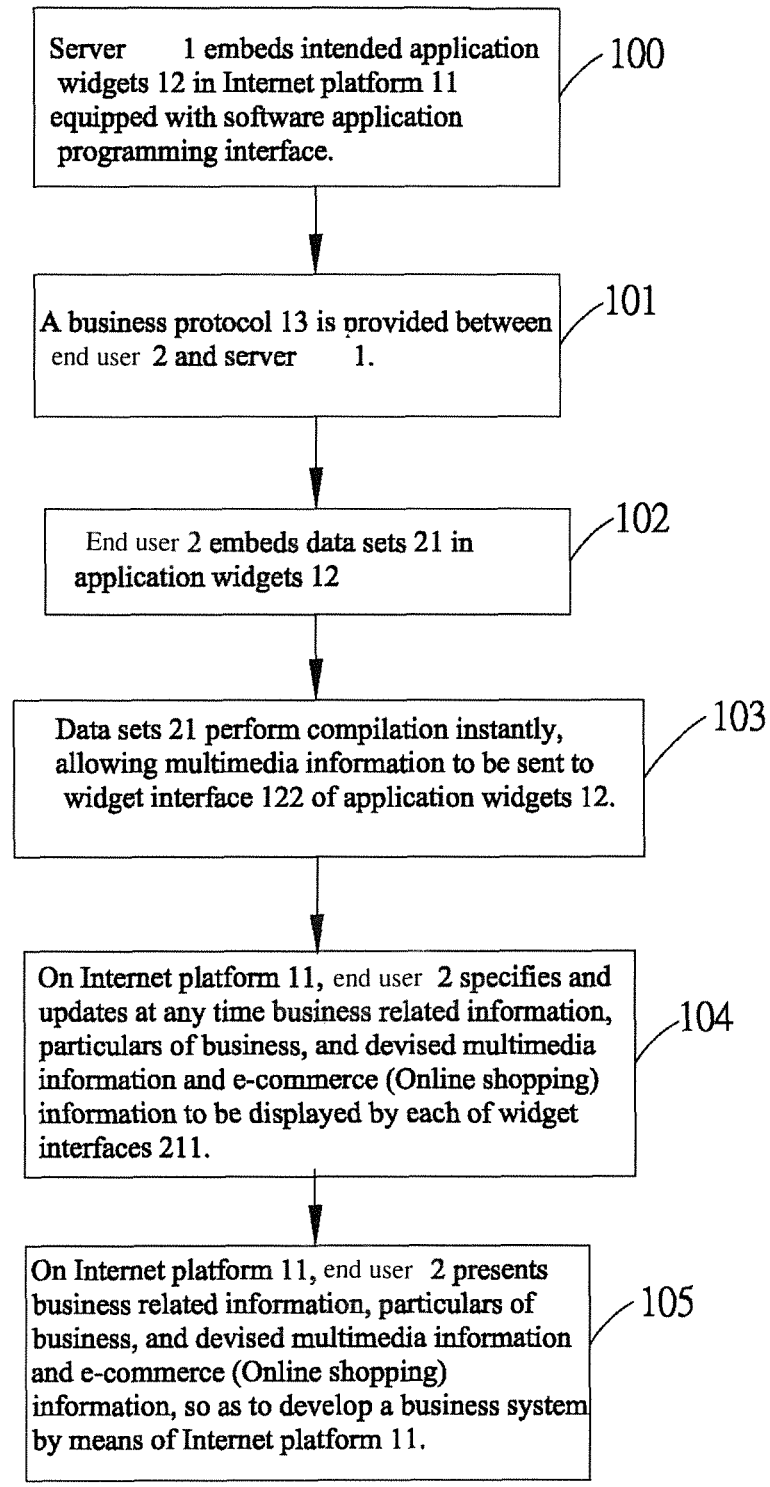
FIG. 2 is a first flow chart of a business process of the present invention.

Referring to FIGS. 1 and 2, to promote business on the Internet platform 1, an end user takes the following steps:

(100). A server end 1 embeds intended application widgets 12 in an Internet platform 11 equipped with a software application programming interface, (101) A business protocol 13 is provided between the server 1 and an end user 2.

(102) The end user 2 embeds data sets 21 in the application widgets 12.

(103) The data sets 21 performs compilation instantly, allowing multimedia information to be sent to a widget interface 122 of the application widgets 12.

(104) On the Internet platform 11, the end user 2 specifies and updates at any time business related information, particulars of business, and devised multimedia information and e-commerce (Online shopping) information to be displayed by each of the widget interfaces 211.

(105) On the Internet platform 11, the end user 2 presents business related information, particulars of business, and devised multimedia information and e-commerce (Online shopping) information, so as to develop a business system by means of the Internet platform 11.

Figure 3:
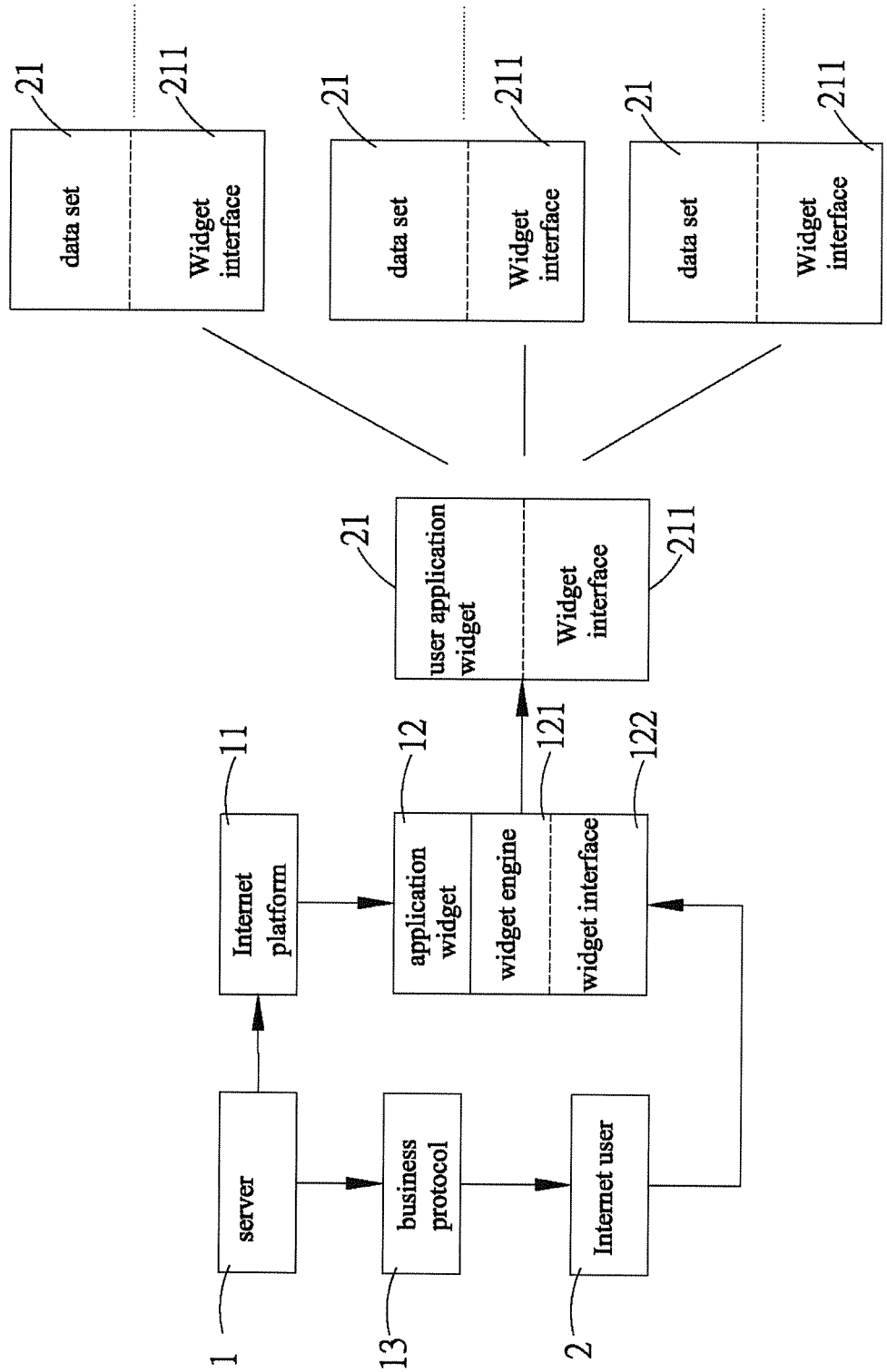
FIG. 3 is a second block diagram of a business process of the present invention.

Referring to FIG. 3, which is a block diagram of a new architecture based on the disclosures in FIG. 1, in another preferred embodiment for a business model based on multi-level application widgets of the present invention, the application widgets 12 are embedded in the Internet platform 11 at the server 1, and the business protocol 13 is formed between the server 1 and the end user 2. Once the end user 2 embeds the data sets 21 in the application widgets 12, the data sets 21 will instantly perform compilation, allowing a variety of e-commerce (Online shopping) information and multimedia information of the widget interface 211 of the data sets 21 to be displayed within the same Web window by means of the widget interface 122 at the bottom. Afterward, the end user 2 determines whether more said application widgets 12 or more said data sets 21 are to be embedded in the embedded data sets 21 as needed (in other words, the end user 2 independently determines whether editing is to continue and whether more multimedia information and e-commerce (Online shopping) information are to be created). In response to a negative determination, editing is terminated. In response to an affirmative determination, the end user 2 determines whether more said application widgets 12 or more said data sets 21 are to be embedded in the embedded data sets 21 (in other words, the end user 2 independently determines whether editing is to continue and whether more multimedia information and e-commerce (Online shopping) information are to be created). In response to a negative determination, editing is terminated. In response to an affirmative determination, the end user 2 finalizes the multi-level application widgets. At this point, the widget engines 121 of the application widgets 12 compile related parameters, and then multimedia information is sent to the widget interfaces 122 of the application widgets 12, respectively. Then, the widget interfaces 122 display the multimedia information or e-commerce (Online shopping) information. In so doing, the end user 2 not only develops a business system by means of the Internet platform 11 but also saves editing time.

Figure 4:
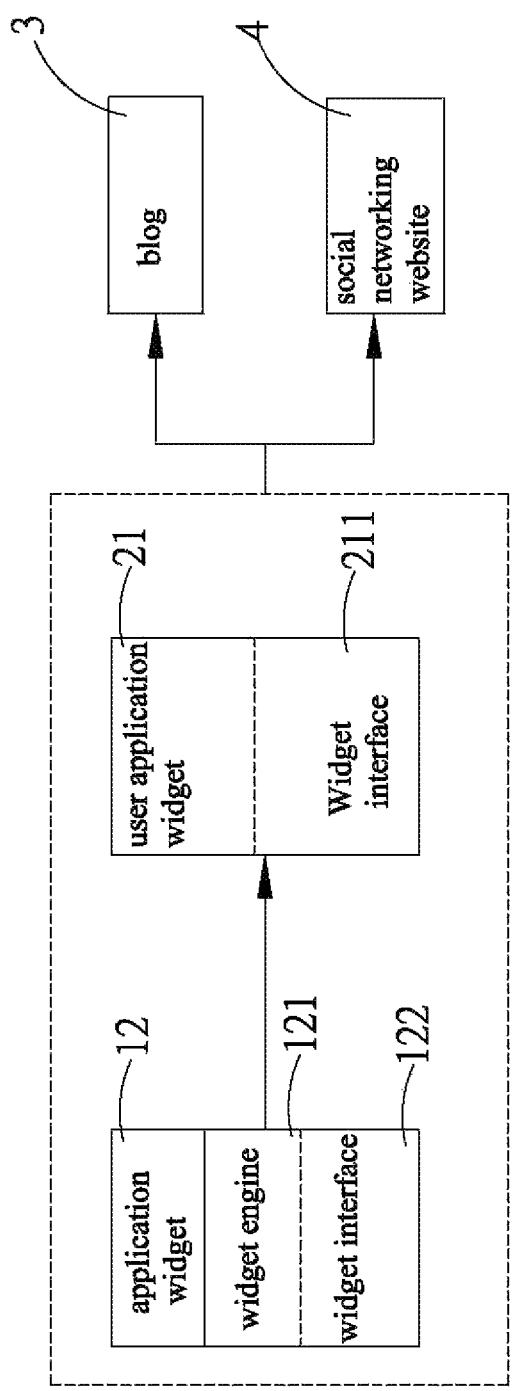
FIG. 4 is a third block diagram of a business process of the present invention.
Figure 5:
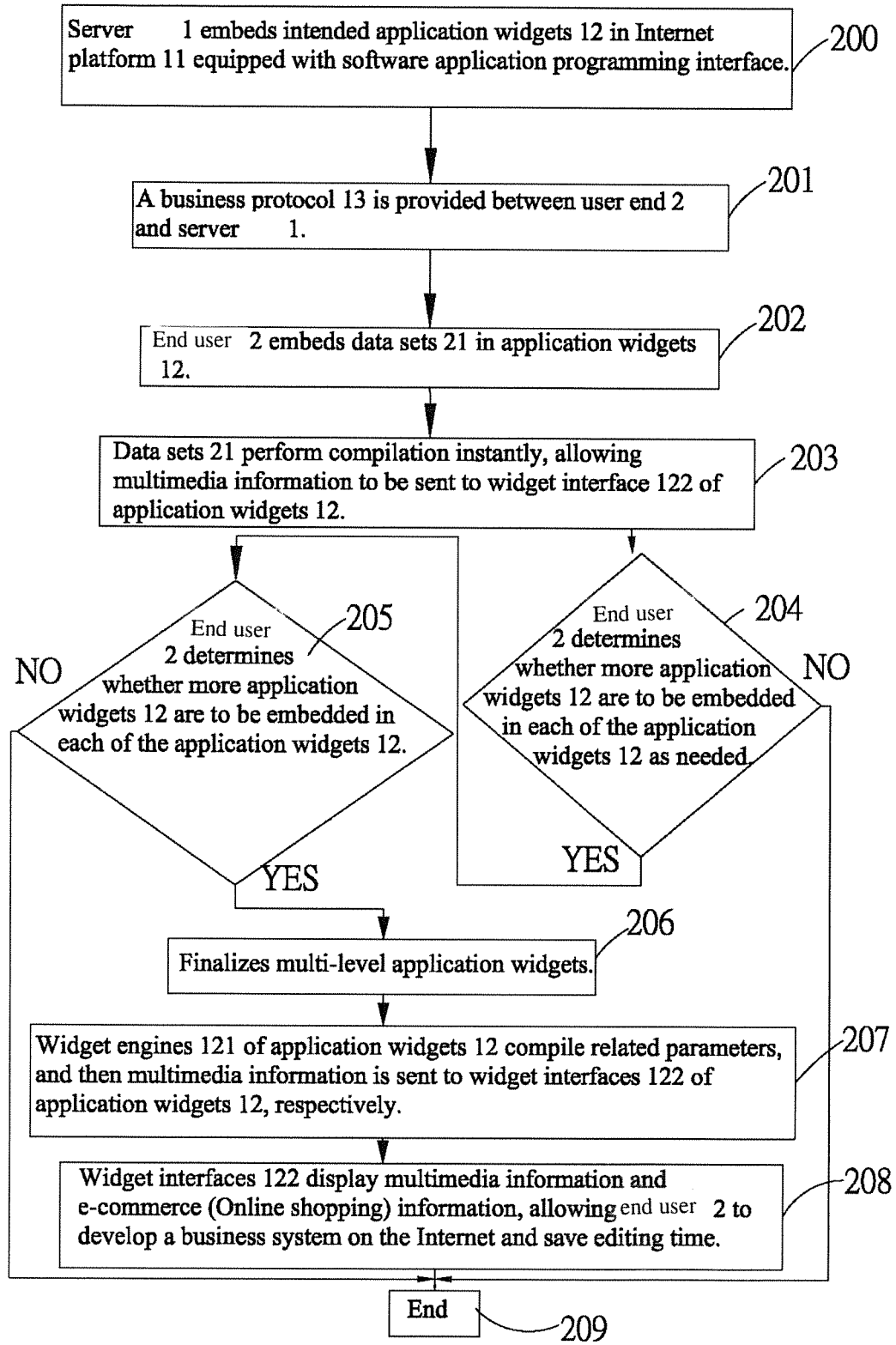
FIG. 5 is a second flow chart of a business process of the present invention.

Referring to FIGS. 3, 4 and 5, to promote business on the Internet platform 11 by means of the multi-level application widgets, an end user takes the following steps:

(200) A server end 1 embeds intended application widgets 12 in an Internet platform 11 equipped with a software application programming interface.

(201) A business protocol 13 is provided between the server 1 and an end user 2.

(202) The end user 2 embeds data sets 21 in the application widgets 12.

(203) The data sets 21 perform compilation instantly, allowing multimedia information to be sent to a widget interface 122 of the application widgets 12.

(204) The end user 2 determines whether more said application widgets 12 are to be embedded in each of the application widgets 12 as needed. Go to step 205 in response to an affirmative determination. Go to step 209 in response to a negative determination.

(205) The end user 2 determines whether more said application widgets 12 are to be embedded in each of said application widgets 12. Go to step 206 in response to an affirmative determination. Go to step 209 in response to a negative determination.

(206) The end user 2 finalizes the multi-level application widgets.

(207) The widget engines 121 of the application widgets 12 compile related parameters, and then multimedia information is sent to the widget interfaces 122 of the application widgets 12, respectively.

(208) The widget interfaces 122 display the multimedia information and e-commerce (Online shopping) information, allowing the end user 2 to develop a business system on the Internet and save editing time.

(209) End

Referring to FIG. 4, to allow the end user 2 to expand business on the Internet platform 11 by means of the multi-level application widgets, a variety of multimedia information and e-commerce (Online shopping) information of the widget interface 211 of the data sets 21 are displayed within the same Web window by the widget interface 122 at the bottom, and the multi-level application widgets are linked to a blog 3 or a social networking website 4 according to the needs of the end user 2 so as to display a variety of multimedia information and e-commerce (Online shopping) information of the widget interface 211 of the data sets 21 on the blog 3 or the social networking website 4.

The multi-level application widgets are embedded in a Web server capable of real-time interaction and linked to the Web server via the application widgets 12. Real-time interaction between the end users 2 takes place on the Web server, using the data sets 21. For instance, the end users 2 have video chat through the widget interface 211 in a real-time, convenient, and time-saving manner, which overcomes a drawback of the prior art, namely the prior art teaches starting a video window through a video software interface in order to perform video interaction within the video window. The video interaction takes place in real time and includes interactive video, interactive chat rooms, interactive forums, interact games, etc.

The present invention further provides a system for performing a business model with multi-level application widgets. The system comprises: a server for providing at least an application widget; an Internet platform having a software application programming interface and a webpage to be embedded with the application widget by the server, wherein the webpage is loaded with a list related parameter of the application widget; a database linked to the Internet platform, wherein parameters of intended said application widgets are retrieved from the database, put on the webpage of the Internet platform, and sent to the application widgets by the server; and at least an end user for providing at least a data set to be embedded in the application widgets through the Internet platform, displaying the data sets on the Internet platform so as to be viewed by the end user, and having at least an editing message for selectively embedding a said application widget in another said application widget so as to edit and finalize multi-level application widgets.

In conclusion, the present invention is directed to a business model based on multi-level application widgets, which has the following advantages:

1. After finalizing a business protocol, end users can create multi-level application widgets on an Internet platform.
2. The end users can display and operate a variety of multimedia information and e-commerce (Online shopping) information in the same window.
3. It takes less time to edit.
4. The end users expand their business by means of the Internet platform.
5. The end users change multimedia information independently and quickly.

The business model further comprises using a computer-readable recordable medium. The computer-readable recordable medium is stored with a computer program for executing the aforesaid steps with a computer. The computer-readable recordable medium is a floppy disk, a hard disk, a CD-ROM, a flash drive, a magnetic tape, an Internetaccessible database, or any storage medium readily conceivable by persons skilled in the art and characterized by equivalent functions.

The foregoing preferred embodiments are only illustrative of the features and functions of the present invention but are not intended to restrict the scope of the present invention. Changes and modifications within the field of the present invention and readily conceivable to persons skilled in the art should fall within the scope of the appended claims of the present invention.

What is claimed is:

1. A computer implemented method for providing multi-level widgets, the computer implemented method comprising the steps of:
   providing, by a server, application widgets to be embedded in a webpage of an Internet platform equipped with a software application programming interface;
   selecting and loading, by the server, a list related parameter of the application widgets from a webpage on the Internet platform, wherein the Internet platform is linked to a database from which intended parameters of the application widgets are loaded and sent to application widgets via the webpage on the Internet platform;
   embedding, by a client user, at least a data set provided by the client user in the application widgets, wherein the data sets embedded by the client are displayed on the Internet platform so as to be viewed by the client, wherein the data sets provide a business protocol between the client user and the server;
   embedding selectively one of said application widgets in another one of said application widgets according to at least an editing message of the client user, so as to edit and finalize multi-level application widgets; and
   wherein the data sets embedded by the client user display real-time interaction information;
   wherein the multi-level application widgets are provided with a widget engine and a widget interface, and the widget engine receives the intended parameters, complies with the parameters received, and loads multimedia information of the widget interface of the multimedia application widgets, and the multimedia information loaded undergoes computation and conversion by a code of a programming application before being sent to the widget interface, and the widget interface displays the multimedia information and selected e-commerce information;
   wherein the intended parameters are sent to the application widgets to enable the application widgets to start loading, and, upon receipt of event related information, the Internet platform sends the parameters to the application widgets so as to enable the application widgets to start operation;
   wherein the data sets embedded by the client user display multimedia e-commerce information.

2. The computer implemented method of claim 1, wherein the multi-level application widgets are embedded in a blog or a social networking website so as to develop a business system on the blog or the social networking website.

3. The computer implemented method of claim 1, wherein the e-commerce information comprises Online shopping information.

4. The computer implemented method of claim 1, wherein the Internet platform is one selected from the group consisting of a web browser, an operating system platform, and a mobile device.

5. The computer implemented method of claim 1, wherein the software application programming interface is one of an application programming interface (API) and a software development kit (SDK).

6. The computer implemented method of claim 1, wherein the multi-level application widgets have a tree data structure.

7. A system for performing a business model with multi-level application widgets, comprising:
   a server for providing at least an application widget;
   an Internet platform having a software application programming interface and a webpage to be embedded with the application widget by the server, wherein the webpage is loaded with a list of related parameters of the application widget;
   a database linked to the Internet platform, wherein said related parameters of said application widget are retrieved from the database, put on the webpage of the Internet platform, and sent to the application widget by the server;
   said application widget having a data set provided by an end user embedded in the application widget through the Internet platform, the data sets being displayed on the Internet platform so as to be viewed by an end user, and having at least an editing message for selectively embedding said application widget in another application widget so as to edit and finalize multi-level application widget; and
   wherein the data sets embedded by the end user display real-time interaction information.

8. The system of claim 7, further comprising at least a blog or at least a social networking website, wherein the multi-level application widgets are embedded in the blog or the social networking website, to thereby develop a business system using the blog or the social networking website.

9. The system of claim 7, wherein the data sets embedded by the end user display multimedia information.

10. The system of claim 7, wherein the data sets embedded by the end user display e-commerce information.

11. The system of claim 10, wherein the e-commerce information comprises Online shopping information.

12. The system of claim 7, wherein the Internet platform is one selected from the group consisting of a web browser, an operating system platform, and a mobile device.

13. A computer program product comprising a non-transitory computer readable medium configured to be stored with a computer program for use in a business model performed with multi-level application widgets, wherein the method of claim 1 is performed to completion upon execution of the computer program loaded to an Internet platform equipped with a software application programming interface.

* * * * *